United States Patent [19]

Babcock et al.

[11] Patent Number: 6,103,388
[45] Date of Patent: Aug. 15, 2000

[54] USE OF LOW TOXICITY SOLVENTS IN WATERBORNE ADHESIVES

[75] Inventors: Kristina Babcock, North Brunswick; Joseph Wieczorek, Jr., Flemington, both of N.J.

[73] Assignee: National Starch and Chemical Investment Holding Corporation, Wilmington, Del.

[21] Appl. No.: 09/010,082

[22] Filed: Jan. 21, 1998

[51] Int. Cl.⁷ ...................................................... B32B 9/04
[52] U.S. Cl. ........................... 428/484; 428/486; 428/511; 428/514; 524/284; 524/315; 524/487; 524/490; 524/491; 524/503; 524/563; 524/755; 524/761; 524/832
[58] Field of Search ..................................... 428/484, 486, 428/511, 514; 524/284, 3.5, 487, 490, 491, 503, 563, 755, 761, 832

[56] References Cited

U.S. PATENT DOCUMENTS

| 5,100,944 | 3/1992 | Walker et al. | 524/306 |
| 5,236,624 | 8/1993 | Lepert et al. | 252/314 |
| 5,442,001 | 8/1995 | Jones et al. | 524/292 |

*Primary Examiner*—Helen L. Pezzuto
*Attorney, Agent, or Firm*—Ellen T. Dec

[57] ABSTRACT

The use of up to about 20 parts by weight of an organic solvent selected from the group consisting of the water soluble polyalkylene glycol ethers in conventional waterborne packaging and converting adhesives provides comparable or better adhesive products with reduced environmental and health related problems.

4 Claims, No Drawings

USE OF LOW TOXICITY SOLVENTS IN WATERBORNE ADHESIVES

FIELD OF THE INVENTION

This invention pertains to waterborne adhesives suitable for use on waxy substrates.

BACKGROUND OF THE INVENTION

The packaging adhesive area has traditionally been dominated by waterborne adhesives based on polyvinyl acetate homo-, co- or terpolymer dispersions. In many of these packaging applications, organic or inorganic solvents are added to enhance the ability of the waterborne adhesive to "wet-out" and penetrate the substrate, thereby improving adhesion. Halogenated solvents, and particularly methyl chloroform (1,1,1-trichloroethane), are most commonly used for these purposes, however, their potential environmental and health related effects have resulted in a search for a satisfactory alternative solvent. U.S. Pat. No. 5,100,944 discloses the effectiveness of ethylene glycol diacetate as a substitute to methyl chloroform to wet out and penetrate substrates. However, this solvent is not completely effective as a penetrant on waxy substrates. U.S. Pat. No. 5,442,001 discloses the use of $C_1$–$C_5$ alkyl butyrates, d-limonene, ethylene glycol monobutyl ether and $C_5$–$C_{20}$ petroleum distillates and normal paraffins in place of methyl chloroform (1,1,1-trichloroethane) in conventional waterborne packaging and converting adhesives which provide adhesive products with reduced environmental and health related problems.

SUMMARY OF THE INVENTION

It has now been found that when certain organic solvents, such as water soluble polyalkylene glycol ethers, are used in waterborne packaging and converting adhesives, improved penetration and wetting out of waxy substrates are obtained yielding adhesive properties comparable to or better than those achieved with $C_{5-20}$ petroleum distillates or methyl chloroform. In addition, the organic solvents of the present invention have very low VOC levels making them highly desirable from an environmental standpoint. Thus, the present invention is directed to waterborne packaging and converting adhesives comprising:

A) a mixture containing:
   a) a dispersion of a polymer selected from the group consisting of vinyl acetate, ethylene/vinyl acetate and all-acrylic polymers, the dispersion being present in an amount effective to impart adhesive properties required for use as a packaging or converting adhesives;
   b) i) 0 to 20 parts by weight plasticizer;
      ii) 0 to 10 parts by weight polyvinyl alcohol;
      iii) 0 to 20 parts by weight tackifier;
      iv) 0 to 20 parts by weight filler;
      v) 0 to 20 parts by weight humectant;
      vi) 0 to 20 parts by weight of mixtures of i–v;
      vii) 0 to 25 parts by weight thickener; and
B) up to about 20 parts by weight of an organic solvent selected from the group consisting of the water soluble polyalkylene glycol ethers.

DETAILED DESCRIPTION OF THE INVENTION

Suitable specific solvents are water soluble polyalkylene glycol ethers with a viscosity of 20–380 cST. Examples of suitable solvents include EMKAROX VG20W, a polyalkylene glycol ether with a viscosity of 20 cST and density at 20° C. of 1.0550; EMKAROX VG70W, a polyalkylene glycol ether with a viscosity of 70 cST and density at 20° C. of 1.0560; and EMKAROX VG379W, a polyalkylene glycol ether with a viscosity of 380 cST, and density at 20° C. of 1.0572, all of which are available from ICI Performance Chemicals.

The specified solvents may be used with any conventional waterborne vinyl acetate, ethylene/vinyl acetate or all-acrylic based packaging or converting adhesive formulation. Surprisingly, it has been, found that the organic solvents utilized in the inventive adhesives may be used at substantially lower levels than would be required with methyl chloroform (1,1,1-trichloroethane) to achieve comparable performance in the same adhesive system when applied to waxy substrates. The organic solvents are used at levels comparable to other low VOC solvents such as those disclosed in U.S. Pat. No. 5,442,001.

By waxy substrate it is meant that the substrates have been coated with a wax material where at least one of the following properties is desired: moisture barrier, water resistance, grease resistance, abrasion resistance or chemical resistance. An exemplary wax material is paraffin. Waxy substrates, as used herein, are not intended to include those substrates coated with polymeric materials which have been modified with low levels of wax components, such as styrene/acrylic or polyethylene materials modified with wax emulsions. Although the inventive adhesives exhibit adhesion to nonwaxy substrates which is comparable to or better than conventional packaging and converting adhesives, the advantages of the inventive adhesives are realized best when used to bond waxy substrates.

The precise formulation of the adhesives will vary depending upon the specific end use. In general, the adhesives will comprise dispersions of vinyl acetate, ethylene/vinyl acetate or all-acrylic polymers. The vinyl acetate polymers may be a polyvinyl acetate homopolymer, or copolymers or terpolymers of vinyl acetate with up to 80% of other ethylenically unsaturated copolymerizable comonomers. Examples of such comonomers are alpha olefins and the $C_1$–$C_9$ esters of mono- or dicarboxylic acids, particularly those esters of acrylic, methacrylic and maleic acids. Ethylene, 2-ethyl hexyl acrylate, and dibutyl maleate are the most commonly employed comonomers. The all-acrylic polymers are prepared from acrylic monomers, such as acrylic acid, methacrylic acid, $C_1$–$C_{12}$ alkyl esters of acrylic or methacrylic acid, and $C_1$–$C_8$ alkyl-substituted acrylamides and methacrylamides.

The amount of the vinyl acetate, ethylene/vinyl acetate or all-acrylic polymer dispersion utilized in the adhesives is an amount effective to impart adhesive properties required for use as a packaging or converting adhesives. The actual amount used will depend on factors such as, for example, the particular polymer used in the dispersion and the particular application for which the adhesive may be used, i.e., substrate type, application, conditions, end-use, etc. One skilled in the art, once armed with the present specification, will be able to ascertain the particular level of polymer dispersion required for the particular conditions and circumstances surrounding the particular application. The vinyl acetate, ethylene/vinyl acetate or all-acrylic polymer is generally present in the adhesive in the form of an aqueous dispersion at levels of 20 to 99 parts by weight, preferably from 50 to 90 parts by weight, based on the total weight of the adhesive composition. The polymer dispersion itself will have a solids level of about 50% to 70% by weight, preferably about 55% by weight. Optionally, the vinyl acetate, ethylene/vinyl acetate or all-acrylic polymer dispersion may contain polyvinyl alcohol as a protective colloid, or alternatively, polyvinyl alcohol may be added to the waterborne adhesive formulation. If present, the polyvinyl alcohol is used at levels of 0.1 to 10 parts by weight, preferably 0.5 to 5.0 parts by weight of the total adhesive formulation. As alternatives to polyvinyl alcohol, other stabilizers, such as surfactants, cellulosics, for example hydroxy ethyl cellulose, starch or combinations thereof, may be utilized during polymerization.

Other additives traditionally used in packaging adhesives, such as, plasticizers, defoamers, preservatives, thickeners, rheology modifiers, humectants, fillers, and tackifiers, may be utilized in conventional amounts, and water may be added to obtain a desired application viscosity.

If present, one or more of those plasticizers conventionally used in vinyl acetate-based waterborne packaging adhesives may be used in the adhesive formulation. Representative plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. The plasticizer is generally used in amounts of 2 to 20 parts by weight, preferably 3 to 15 parts.

If present, tackifiers generally will be used in dispersion form at 40% to 65% solids in amounts up to about 50 parts by weight, preferably 2 to 20 parts. Representative tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamide-formaldehyde resin, and wood rosin.

Suitable thickeners include originates, bentonite, casein, fumed silica, guar gum, gum tragacanth, hydroxyethylcellulose, locust bean gum, methylcellulose, polyacrylic acid salts (ammonium, potassium, sodium), polyvinyl alcohol, sodium carboxymethyl cellulose, and starches, and if present, will be used in amounts up to about 25 parts by weight.

Useful fillers include bentonites, calcium carbonate, calcium silicate, clay, mica, nut shell flours, silica, talc, uncooked starches, and wood flour, and if present, will be used in amounts up to about 20 parts by weight.

Suitable humectants include calcium chloride, diethylene glycol, glycerins, hexylene glycol, propylene glycol, magnesium chloride, sodium nitrate, sorbitol, sucrose, and urea, and if present, will be used in amounts up to about 20 parts by weight.

In order to increase the penetrating effects of the adhesive, it is preferred to formulate the adhesive with 0.05 to 5.0 parts by weight of a surfactant. The surfactants may be one or more of anionic, cationic, amphoteric or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. One type of suitable nonionic emulsifier is the addition product of 5 to 50 moles of ethylene oxide adducted to straight-chain and branched-chain alkanols with 6 to 22 carbon atoms, or to alkylphenols, higher fatty acids, higher fatty acid amines, or primary and secondary higher alkyl amines. Other suitable non-ionic emulsifiers are one or more block copolymers of propylene oxide with ethylene oxide. Preferred surfactants include those of the chemical family of ethoxylated acetylenic diols.

To formulate the adhesive with improved adhesion and penetration to waxy substrates, one or more of the specific disclosed solvents are added to the adhesive in amounts of up to about 20 parts by weight, preferably 3 to 20 parts by weight, based on the total weight of the adhesive composition. The actual amount of solvent used will depend on the particular solvent chosen, the particular base adhesive, and on the particular substrate to which the adhesive is applied. Where the substrates have light wax coatings applied thereto, or have no wax coating applied thereto, the solvent may be used at amounts as low as 1% by weight. Where substrates have heavy wax coatings applied thereto, the solvent is preferably used in amounts of at least 3% by weight. In addition to having low VOC levels, these solvents have the added advantage of being odorless, a desirable property in the packaging industry.

The resultant adhesives, when appropriately formulated, may be used in virtually any packaging and converting applications in which waterborne adhesives are commonly employed, including case and carton forming and sealing, tube winding, bag manufacture, glued lap, paper, envelope manufacturing and flexible film laminating. However, the improved adhesion and penetration properties of the inventive adhesives are realized best when the adhesives are used to bond waxy substrates.

Typical waxy substrates include, for example, paraffin wax coated corrugated fiberboard and varying grades of paraffin wax coated paper. Typical examples of articles manufactured from the waxy substrates include, without limitation, envelopes, paper bags, milk and juice cartons, drinking cups, containers for shipping produce and the like, and other applications where properties such as water resistance, grease resistance, abrasion resistance, chemical resistance, moisture impermeability are desired. The waxy substrates, and accordingly the articles manufactured therefrom, will have applied to a portion thereof the packaging or converting adhesive. Depending on the particular application, the waxy substrate may have substantially all of one surface coated, or may be coated on two sides. Alternately, the adhesive may be applied as a bead, whereby a minor portion of the substrate has applied thereto the adhesive. One skilled in the art, once armed with the present specification, will readily ascertain those applications in which the use of the inventive adhesives would be advantageous. Any conventional method of applying the adhesives to the particular substrates may be employed. These methods are well known in the field of packaging and converting adhesives.

EXAMPLES

Waterborne adhesives suitable for packaging and converting use were prepared with the disclosed solvents/alternatives and tested for bond strength. The test consisted of bonding two wax coated paper stocks utilizing an add-on rate of 1 wet milliliter of adhesive. The width of the adhesive was drawn on the substrate to 1 inch. All bonds were aged for 72 hours, and then tested on an Instron to generate a bond strength value. A control with the same formulation as the adhesive described below, however without solvent, was tested simultaneously. The results given in the tables below show that adhesives, with the addition of polyalkylene glycol ethers, demonstrated improved adhesion to waxy substrates.

The results are relative to the control on the same substrate, and absolute results varied from day to day depending on ambient conditions in the room.

The following materials were used to prepare the adhesives. DUR-O-SET™ C-325 is a polyvinyl acetate dispersion prepared by a continuous polymerization process and available from National Starch and Chemical Company, Bridgewater, N.J. DUR-O-SET™ E-200 is an ethylene/vinyl acetate prepared by batch process and available from National Starch and Chemical Company. The polyvinyl alcohol was a commercial product sold under the tradename AIRVOL 523 by Air Products and Chemicals. The plasticizer was a mixture of diethylene, dipropylene, glycol dibenzoate, sold under the tradename BENZOFLEX 50 by Velsicol Chemical Corporation. The defoamer was a commercial product sold under the tradename FOAMASTER III by Henkel Corporation. The surfactant was a commercial product sold under the tradename SURFYNOL 440 by Air Products and Chemicals. The preservative was a commercial product sold under the tradename KATHON LX 1.5% by Rohm & Haas Company.

The following polyalkylene glycol ethers, available from Imperial Chemical Industries by the following designations, were used as solvents:

| SOLVENT | VISCOSITY | DENSITY AT 20° C. |
| --- | --- | --- |
| EMKAROX VG20W | 20 cST | 1.0550 |
| EMKAROX VG70W | 70 cST | 1.0560 |
| EMKAROX VG379W | 379 cST | 1.0572 |

Adhesive I: The adhesives were prepared as follows: Polyvinyl alcohol was dispersed in water, heated with stirring to 850 to 91° C. (185° to 195° F) for one hour or until smooth, and then cooled to below 60° C. (140F). Commercial polyvinyl acetate or ethylene/vinyl acetate dispersions were added to the polyvinyl alcohol solution with stirring for 30 minutes. Then, sequentially, diethylene glycol dibenzoate as plasticizer, polyalkylene glycol ether solvent, defoamer, surfactant, and preservative were added. The entire mixture was stirred for one hour and diluted to the desired viscosity with water, 2000 cps.

EXAMPLE I

An adhesive, prepared as above and designated sample Adhesive I, is based on a standard general packaging adhesive for use on corrugated fiberboards coated with a wax emulsion-modified polyethylene blend. In this example, EMKAROX VG20W was the solvent and substrate penetrant. Table I shows the bond strength values for a polyvinyl acetate base adhesive and Table II shows the bond strength values for with a ethylene/vinyl acetate based adhesive. With polyvinyl acetate as the base adhesive, and up to 20 parts by weight EMKAROX VG20W, the bond strength results indicate stronger bond formation than obtained with the control. With ethylene/vinyl acetate as the base adhesive, and up to 10 parts by weight EMKAROX VG20W, the bond strength results indicate stronger bond formation than obtained with the control. Unless otherwise specified, all parts by weight reported below are based on the total weight of the adhesive formulation.

TABLE I

| ADHESIVE COMPOSITION | IA | IB | IC | ID | IE |
| --- | --- | --- | --- | --- | --- |
| WATER | 10.00 | 10.00 | 9.70 | 9.00 | 8.00 |
| POLYVINYL ALCOHOL | 2.00 | 2.00 | 1.94 | 1.80 | 1.60 |
| POLYVINYL ACETATE | 82.35 | 81.35 | 79.88 | 74.11 | 65.88 |
| DEFOAMER | 0.20 | 0.20 | 0.19 | 0.18 | 0.16 |
| SURFACTANT | 0.30 | 0.30 | 0.29 | 0.27 | 0.24 |
| PRESERVATIVE | 0.15 | 0.15 | 0.15 | 0.14 | 0.12 |
| PLASTICIZER | 5.00 | 5.00 | 4.85 | 4.50 | 4.00 |
| EMKAROX VG20W | — | 1.00 | 3.00 | 10.00 | 20.00 |
| ADJUSTMENT WATER (%) | 9.00 | 10.00 | 9.00 | 9.00 | 10.00 |
| BOND STRENGTH VALUES g/in | 135.5 | 153.5 | 194.4 | 206.0 | 166.7 |

TABLE II

| ADHESIVE COMPOSITION | IF | IG | IH | IJ |
| --- | --- | --- | --- | --- |
| WATER | 10.00 | 9.70 | 9.00 | 8.00 |
| POLYVINYL ALCOHOL | 2.00 | 1.94 | 1.80 | 1.60 |
| ETHYLENE/VINYL ACETATE | 82.35 | 79.88 | 74.11 | 65.88 |
| DEFOAMER | 0.20 | 0.19 | 0.18 | 0.16 |
| SURFACTANT | 0.30 | 0.29 | 0.27 | 0.24 |
| PRESERVATIVE | 0.15 | 0.15 | 0.14 | 0.12 |
| PLASTICIZER | 5.00 | 4.84 | 4.50 | 4.00 |
| EMKAROX VG20W | — | 3.00 | 10.00 | 20.00 |
| ADJUSTMENT WATER (%) | 5.00 | 4.00 | 4.00 | 4.00 |
| BOND STRENGTH VALUES g/in | 193.3 | 229.4 | 216.7 | 185.0 |

EXAMPLE II

This example shows the bond strength results for Adhesive I prepared with EMKAROX VG70W as the solvent. Table III shows the results with Adhesive I based on polyvinyl acetate and Table IV shows the results with adhesive I based on ethylene/vinyl acetate. With polyvinyl acetate as the base adhesive, and up to 15 parts by weight EMKAROX VG70W, the bond strength results indicate stronger bond formation than obtained with the control. With ethylene/vinyl acetate as the base adhesive, and up to 12 parts by weight EMKAROX VG70W, the bond strength results indicate stronger bond formation than obtained with the control.

TABLE III

| ADHESIVE COMPOSITION | IIA | IIB | IIC | IID | IIE | IIF | IIG |
| --- | --- | --- | --- | --- | --- | --- | --- |
| WATER | 10.00 | 9.70 | 9.00 | 8.80 | 8.50 | 8.20 | 8.00 |
| POLYVINYL ALCOHOL | 2.00 | 1.94 | 1.80 | 1.76 | 1.70 | 1.64 | 1.60 |
| POLYVINYL ACETATE | 82.35 | 79.88 | 74.11 | 72.47 | 69.99 | 67.53 | 65.88 |
| DEFOAMER | 0.20 | 0.19 | 0.18 | 0.18 | 0.17 | 0.16 | 0.16 |
| SURFACTANT | 0.30 | 0.29 | 0.27 | 0.26 | 0.26 | 0.25 | 0.24 |
| PRESERVATIVE | 0.15 | 0.15 | 0.14 | 0.13 | 0.13 | 0.12 | 0.12 |
| PLASTICIZER | 5.00 | 4.85 | 4.50 | 4.40 | 4.25 | 4.10 | 4.00 |
| EMKAROX VG70W | — | 3.00 | 10.00 | 12.00 | 15.00 | 18.00 | 20.00 |
| ADJUSTMENT WATER (%) | 9.00 | 9.00 | 9.50 | 15.00 | 15.00 | 20.00 | 12.00 |
| BOND STRENGTH VALUES g/in | 135.5 | 199.1 | 211.3 | 150.1 | 150.7 | — | 101.1 |

TABLE IV

| ADHESIVE COMPOSITION | IIG | IIH | IIJ | IIK | IIL | IIM |
|---|---|---|---|---|---|---|
| WATER | 10.00 | 9.70 | 9.00 | 8.80 | 8.50 | 8.00 |
| POLYVINYL ALCOHOL | 2.00 | 1.94 | 1.80 | 1.76 | 1.70 | 1.60 |
| ETHYLENE/VINYL ACETATE | 82.35 | 79.88 | 74.11 | 72.47 | 69.99 | 65.88 |
| DEFOAMER | 0.20 | 0.19 | 0.18 | 0.18 | 0.17 | 0.16 |
| SURFACTANT | 0.30 | 0.29 | 0.27 | 0.26 | 0.26 | 0.24 |
| PRESERVATIVE | 0.15 | 0.15 | 0.14 | 0.13 | 0.13 | 0.12 |
| PLASTICIZER | 5.00 | 4.84 | 4.50 | 4.40 | 4.25 | 4.00 |
| EMKAROX VG70W | — | 3.00 | 10.00 | 12.00 | 15.00 | 20.00 |
| ADJUSTMENT WATER (%) | 5.00 | 5.00 | 5.00 | 10.00 | 10.00 | 15.00 |
| BOND STRENGTH VALUES g/in | 193.3 | 218.6 | 218.3 | 192.2 | 163.4 | 150.6 |

EXAMPLE III

This example shows the bond strength results for an adhesive prepared with EMKAROX VG379W as the solvent. Table V shows the results with a polyvinyl acetate base adhesive and Table VI shows the results with a ethylene/vinyl acetate based adhesive. With polyvinyl acetate as the base adhesive, and up to 5 parts per weight EMKAROX VG379W, the bond strength results indicate stronger bond formation than obtained with the control. With ethylene/vinyl acetate as the base adhesive, and up to 7 parts per weight EMKAROX VG379W, the bond strength results indicate stronger bond formation than obtained with the control.

TABLE V

| ADHESIVE COMPOSITION | VA | VB | VC | VD | VE | VF | VG |
|---|---|---|---|---|---|---|---|
| WATER | 10.00 | 9.70 | 9.50 | 9.30 | 9.10 | 9.00 | 8.00 |
| POLYVINYL ALCOHOL | 2.00 | 1.94 | 1.90 | 1.86 | 1.82 | 1.80 | 1.60 |
| POLYVINYL ACETATE | 82.35 | 79.88 | 78.23 | 76.58 | 74.94 | 74.11 | 65.88 |
| DEFOAMER | 0.20 | 0.19 | 0.19 | 0.19 | 0.18 | 0.18 | 0.16 |
| SURFACTANT | 0.30 | 0.29 | 0.29 | 0.28 | 0.27 | 0.27 | 0.24 |
| PRESERVATIVE | 0.15 | 0.15 | 0.14 | 0.14 | 0.14 | 0.14 | 0.12 |
| PLASTICIZER | 5.00 | 4.85 | 4.75 | 4.65 | 4.55 | 4.50 | 4.00 |
| EMKAROX VG379W | — | 3.00 | 5.00 | 7.00 | 9.00 | 10.00 | 20.00 |
| ADJUSTMENT WATER (%) | 9.00 | 9.00 | 15.00 | — | — | 19.00 | 30.00 |
| BOND STRENGTH VALUES g/in | 135.5 | 167.5 | 147.7 | — | — | — | — |

TABLE VI

| ADHESIVE COMPOSITION | VIF | VIG | VIH | VIJ | VIK | VIL | VIM |
|---|---|---|---|---|---|---|---|
| WATER | 10.00 | 9.70 | 9.50 | 9.30 | 9.10 | 9.00 | 8.00 |
| POLYVINYL ALCOHOL | 2.00 | 1.94 | 1.90 | 1.86 | 1.82 | 1.80 | 1.60 |
| ETHYLENE/VINYL ACETATE | 82.35 | 79.88 | 78.23 | 76.58 | 74.94 | 74.11 | 65.88 |
| DEFOAMER | 0.20 | 0.19 | 0.19 | 0.19 | 0.18 | 0.18 | 0.16 |
| SURFACTANT | 0.30 | 0.29 | 0.29 | 0.28 | 0.27 | 0.27 | 0.24 |
| PRESERVATIVE | 0.15 | 0.14 | 0.14 | 0.14 | 0.14 | 0.14 | 0.12 |
| PLASTICIZER | 5.00 | 4.85 | 4.75 | 4.65 | 4.55 | 4.50 | 4.00 |
| EMKAROX VG379W | — | 3.00 | 5.00 | 7.00 | 9.00 | 10.00 | 20.00 |
| ADJUSTMENT WATER (%) | 5.00 | 10.00 | 15.00 | 20.00 | 15.00 | — | — |
| BOND STRENGTH VALUES g/in | 193.3 | 220.8 | 207.8 | 199.2 | — | — | — |

All of the above examples show that the adhesion of waterborne packaging and converting adhesives can be improved by the addition of specific nontoxic organic solvents, particularly where bonding of waxy substrates is required.

We claim:

1. An article having applied to a portion thereof a packaging or converting adhesive composition, the adhesive composition comprising:
   A) a mixture containing:
      a) a dispersion of a polymer selected from the group consisting of vinyl acetate and all-acrylic polymers, the dispersion being present in an amount effective to impart adhesive properties required for use as a packaging or converting adhesives;
      b) i) 0 to 20 parts by weight plasticizer;
         ii) 0 to 10 parts by weight polyvinyl alcohol;
         iii) 0 to 20 parts by weight tackifier;
         iv) 0 to 20 parts by weight filler;
         v) 0 to 20 parts by weight humectant;
         vi) 0 to 20 parts by weight of mixtures of i–v;
         vii) 0 to 25 parts by weight of thickener; and
   B) up to about 20 parts by weight of a compatible organic solvent selected from the group consisting of the water soluble polyalkylene glycol ethers.

2. The article of claim 1 wherein the polyalkylene glycol ether has a viscosity of 20–380 cST.

3. The article of claim 1 comprising a waxy substrate.

4. The article of claim 3 selected from the group consisting of paraffin-coated paper bags, envelopes, cartons, drinking cups, and containers.

* * * * *